United States Patent
Calderon

(10) Patent No.: US 6,413,606 B1
(45) Date of Patent: Jul. 2, 2002

(54) DRYWALL TAPE

(76) Inventor: Carlos R. Calderon, 3808 Wingleaf Ct., Rockville, MD (US) 20853

(*) Notice: Subject to any disclaimer, the term of this patent is extended or adjusted under 35 U.S.C. 154(b) by 0 days.

(21) Appl. No.: 09/531,418

(22) Filed: Mar. 20, 2000

(51) Int. Cl.⁷ .................................................. B32B 3/10
(52) U.S. Cl. ........................................ 428/61; 428/220
(58) Field of Search .............................. 428/57, 58, 61, 428/110, 220, 906; 52/417

(56) References Cited

U.S. PATENT DOCUMENTS

| | | | |
|---|---|---|---|
| 1,039,363 A | 9/1912 | Chapin | |
| 1,751,327 A | 3/1930 | Haire et al. | |
| 2,064,785 A | 12/1936 | Crandell | |
| T887,014 I4 | 6/1971 | Overbay et al. | |
| 4,042,739 A | 8/1977 | Emal et al. | |
| 4,157,271 A * | 6/1979 | Moore | 156/71 |
| 4,313,991 A | 2/1982 | Lamb | |
| 4,425,175 A * | 1/1984 | Moore | 156/229 |
| 4,792,473 A | 12/1988 | Vitale | |
| 5,246,775 A | 9/1993 | Loscuito | |
| 5,333,433 A * | 8/1994 | Porambo et al. | 52/417 |
| 5,486,394 A | 1/1996 | Stough | |
| 5,604,001 A | 2/1997 | Schold | |
| 5,687,523 A | 11/1997 | Stough | |
| 5,711,124 A | 1/1998 | Stough et al. | |

FOREIGN PATENT DOCUMENTS

JP    2000 087526 A    3/2000

* cited by examiner

*Primary Examiner*—James Sells

(57) ABSTRACT

A drywall tape comprises a narrow paper tape of uniform width and non-uniform thickness including a central portion of greater thickness and side portions of lesser thickness. The tape has a width to be disposed in a depression formed at a drywall joint by sloping outer surface portions of drywall sheets, respectively, forming the joint, such that a planar outer surface of the tape is substantially flush with non-sloping outer surface portions of the drywall sheets, respectively. An adhesive drywall tape includes a narrow paper tape having a layer of yucca adhesive pre-applied thereto. A drywall tape applicator includes a housing for receiving a roll of drywall tape as well as fluid for imparting adhesiveness to the drywall tape as it is dispensed from the housing for application to a drywall joint. A method of finishing a drywall joint includes securing a length of drywall tape over a drywall joint with a yucca adhesive such that the drywall tape extends the entire length of the joint, allowing the yucca adhesive to dry and applying a layer of joint compound over the drywall tape to blend the tape into non-sloping outer surface portions of the drywall sheets forming the joint.

14 Claims, 6 Drawing Sheets

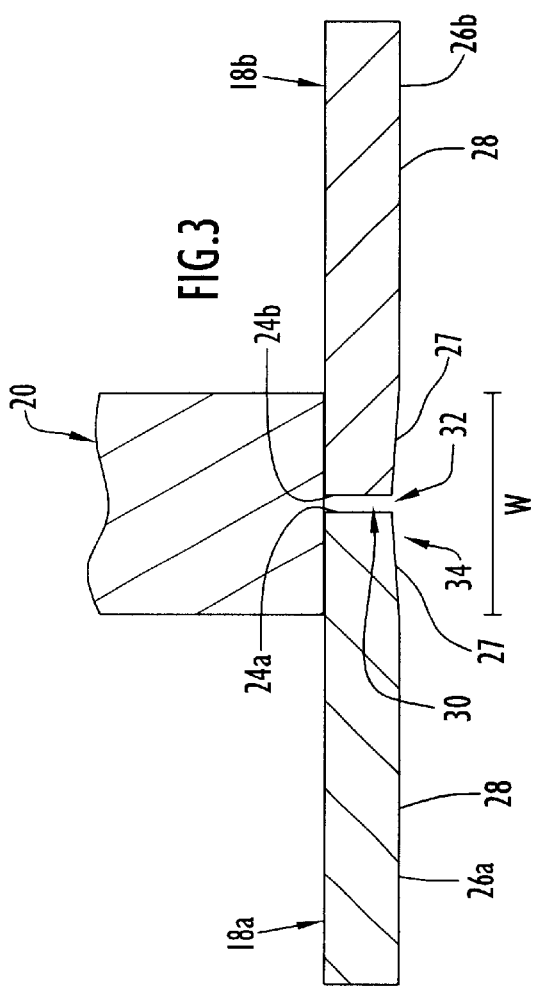
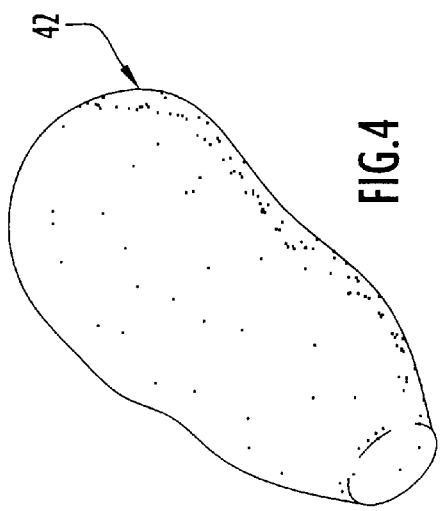
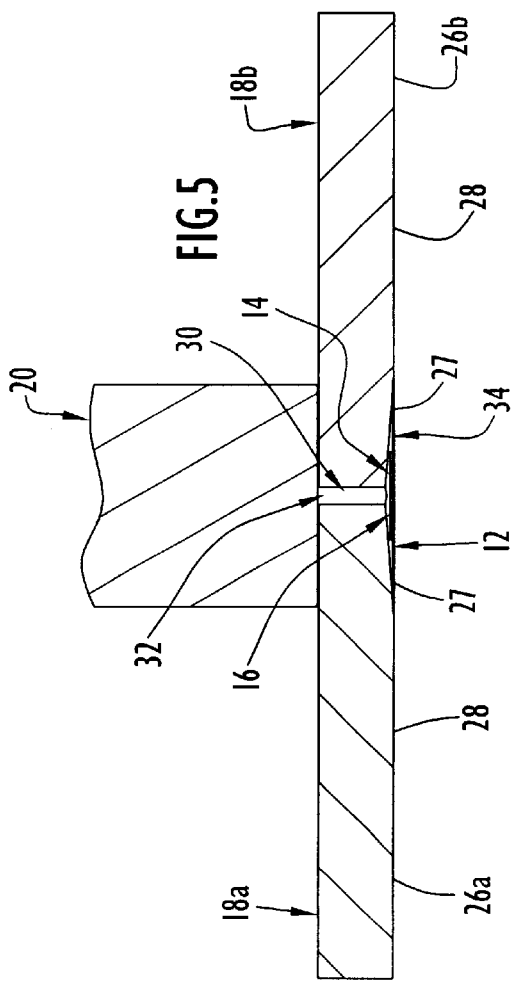
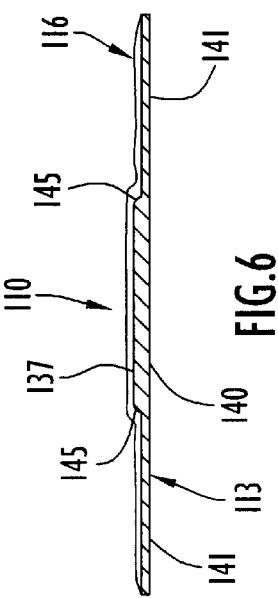

DRYWALL TAPE

BACKGROUND OF THE INVENTION

1. Field of the Invention

The present invention relates to drywall tapes for finishing drywall joints and, more specifically, to drywall tapes having non-uniform cross-sections, to drywall tape applicators and to methods of finishing drywall joints.

2. Brief Description of the Prior Art

In the field of building construction, wall surfaces are typically formed by flat sheets or panels of drywall affixed to underlying support or frame members. The drywall sheets are typically available in a limited assortment of standard sizes, such as 4 feet×8 feet; and, accordingly, a plurality of drywall sheets must be secured to the frame members in adjacent or abutting side-to-side, end-to-end and/or side-to-end relation in order to form a wall surface of larger dimension. Adjacent drywall sheets are placed as close as possible to one another and, preferably, in abutment with one another. Even though the adjacent drywall sheets are placed as close to one another as possible, a gap or groove is presented between adjacent or abutting side and/or end edges of the sheets. As a result, drywall joints are formed along the adjacent or abutting side and/or end edges of adjacent or abutting drywall sheets. Furthermore, the side edges of conventional drywall sheets are typically provided as "factory edges" in that outer surfaces of the drywall sheets, respectively, have non-sloping outer surface portions, respectively, and sloping outer surface portions, respectively, that slope inwardly from the non-sloping outer surface portions to the side edges. Accordingly, when the factory edge of a drywall sheet is adjacent or in abutment with the factory edge of another drywall sheet, the sloping outer surface portions cooperate to form a shallow depression along the thusly formed joint, the depression having a width extending between the non-sloping outer surfaces portions of the drywall sheets, respectively. An individual wall surface will typically have numerous joints, which interrupt the continuity of the wall surface and present an unattractive appearance. If left unfinished, the joints would be visible through the final wall finish, such as paint, wallpaper or other decorative coating, applied to the wall surface.

Conventional building construction techniques involve finishing the joints formed by adjacent or abutting drywall sheets so as to render the joints as invisible as possible after application of the final wall finish. The joints are finished conventionally using a paper drywall tape, such as Sheetrock® Joint Tape manufactured by U.S. Gypsum Company of Chicago, Ill., secured over the joints with joint compound or "mud", an aqueous, cementitious adhesive. Conventional drywall tape is approximately 2 inches in width and is of uniform minimal thickness. The tape is supplied in rolls of various lengths ranging, for example, from 75 feet to 500 feet. According to conventional wall finishing techniques, an initial or bedding layer or coat of joint compound is applied over the joints, and the drywall tape is thereafter applied to the joints over the initial or bedding coat of joint compound. When applying the drywall tape, the width of the tape is centered or substantially centered over the corresponding joint so that the tape bridges the gap or groove thereof and is secured to the outer surfaces of the adjacent or abutting drywall sheets, respectively, forming the joint. The bedding coat of joint compound serves the purposes of filling the gaps of the drywall joints, filling the depressions formed at the joints by the sloping outer surface portions, i.e. the factory edges, of the adjacent or abutting drywall sheets and securing the drywall tape to the outer surfaces of the drywall sheets.

After the joint compound has dried, another layer or coat of joint compound is applied over the tape, in a step known as "blocking", to smoothly blend or merge the tape with the non-sloping outer surface portions of the drywall sheets. Conventional "blocking" involves applying the layer or coat of joint compound as a band or stripe extending along the corresponding joint, the band or stripe being of greater width than the width of the drywall tape so that the joint compound serves to blend or merge side edges of the tape into the non-sloping outer surface portions of the drywall sheets. Usually, the band or stripe is applied so as to have a width of approximately 8 to 10 inches for drywall tape that is 2 inches wide, with the width of the band or stripe being centered or substantially centered over the width of the drywall tape. The joint compound is allowed to dry; and, thereafter, one or more additional layers or coats of joint compound is/are applied over the joints in a step known as "skimming" to render the joints as indistinguishable as possible from the non-sloping outer surface portions of the drywall sheets. The joint compound must typically be allowed to dry between application of the individual coats or layers; and, when dry, the individual coats or layers of joint compound must typically be sanded to obtain a smooth surface merging or blending imperceptively with the non-sloping outer surface portions of the drywall sheets. In addition, the joints usually must be cleaned between the application of individual coats or layers of joint compound in order to achieve the best results. For example, it is desirable that the joints be cleaned to remove dust or other surface debris, such as that generated by sanding.

Wall finishing in accordance with conventional procedures is costly and time consuming due to the materials and labor required. In particular, the need for several coats or layers of joint compound and the need for relatively wide bands of joint compound to "block" the joints adds to the cost of construction. Since the coats or layers of joint compound must be allowed to dry prior to sanding and/or the application of additional coats or layers thereover, it may take several days to finish a wall for painting, papering or other final wall finish. The time required for conventional wall finishing as well as the labor involved in executing the various wall finishing steps further increase the cost of construction.

In addition to the substantial time and cost required, conventional wall finishing techniques also require considerable skill and expertise. It is important, for example, that the tape lay uniformly or evenly as flush or flat as possible with the non-sloping outer surface portions of the drywall sheets and that the tape be sufficiently secured to the drywall sheets to prevent buckling or peeling of the tape. It is also important that the tape not be wrinkled and that there be no air bubbles under the tape. The finished drywall joints should not present abrupt variations in level but, rather, should be imperceptible after the application of paint, paper or other final wall finish. Additionally, the finished joints should not produce shadows or other visual irregularities under various lighting conditions. It is essential, therefore, that the right amount of joint compound be applied to the joints in the correct manner for each layer or coat. Furthermore, the drywall tape must be skillfully applied over the bedding coat of joint compound. In addition, the individual coats or layers of joint compound must be allowed the proper amount of time to dry prior to the application of additional coats or layers of joint compound and/or prior to sanding in order to ensure the aesthetic and structural integrity of the joints. Since application of the joint compound, particularly the "bedding coat", to the joints is messy, care must be taken to avoid getting the joint compound on drywall surfaces other than those intended to have the joint compound applied thereon. Furthermore, the joints must be sanded with care. It is apparent, therefore, that the quality of finished drywall joints obtained with conventional wall finishing techniques is greatly dependent upon the skill and expertise of a particular wall finisher and is thusly subject to human differences.

Even where drywall joints are skillfully finished in accordance with conventional wall finishing techniques, such joints nonetheless present various additional drawbacks. In particular, the drywall tape tends to be undesirably drawn or sucked into the gap or groove between the adjacent or abutting edges of the drywall sheets and/or into the depression formed by the sloping outer surface portions, i.e. the factory edges, of the adjacent or abutting drywall sheets forming the corresponding joint. When this occurs, the joint is impaired upon being finished in that the finished joint is no longer smooth and even with the non-sloping outer surface portions of the drywall sheets and is prone to cracking. Another drawback of conventionally finished joints involves cracking that occurs at such joints in response to natural contraction and expansion of the associated wall or walls. As a result of such cracking, the joints as well as the paint, paper or other final finish of the wall or walls will typically require repair or corrective measures to be taken in order to restore the appearance of the wall or walls. However, such cracking tends to reoccur. A further drawback of conventionally finished drywall joints is that such joints are frequently impaired due to environmental conditions present during the finishing procedure. Wall finishing frequently takes place in partially completed, unheated structures; and, depending on the temperature and/or humidity present during conventional wall finishing procedures, the quality of the joints finished thereby may be less than desirable even where a high level of skill and expertise has been exercised.

Various drywall tapes have been proposed in order to facilitate wall finishing as illustrated in U.S. Pat. No. T887,014 to Overbay et al., U.S. Pat. No. 1,751,327 to Haire et al., U.S. Pat. No. 2,064,785 to Crandell, U.S. Pat. No. 4,042,739 to Emal et al., U.S. Pat. No. 4,313,991 to Lamb, U.S. Pat. No. 4,792,473 to Vitale, U.S. Pat. No. 5,246,775 to Loscuito, U.S. Pat. No. 5,486,394 to Stough, U.S. Pat. No. 5,604,001 to Schold, U.S. Pat. No. 5,687,523 to Stough and U.S. Pat. No. 5,711,124 to Stough et al.

The Overbay et al., Emal et al., Lamb, Vitale, Loscuito, Stough ('394 and '523), Schold and Stough et al. patents all relate to adhesive drywall tapes for direct application to drywall joints without the need for a "bedding coat" of joint compound.

Emal et al. disclose an adhesive drywall tape having a synthetic resin-based adhesive. Adhesive drywall tapes having an acrylic adhesive are disclosed by Vitale, Loscuito, Stough ('394 and '523) and Stough et al. Adhesive drywall tapes having a hot melt adhesive are disclosed by Overbay et al. and Schold.

In Overbay et al., the hot melt adhesive is disposed on the drywall tape non-uniformly so as to provide a maximum amount of adhesive along a center line of the tape.

Lamb discloses an adhesive drywall tape having a central projection on an outer or non-adhesive surface of the tape to cause a trowel for applying plaster over the tape to form a perfectly feathered edge.

Emal et al. disclose an adhesive drywall tape wherein the tape has a thickened center portion on an outer or non-adhesive surface thereof so that the non-adhesive surface becomes flat when the tape is applied to a joint.

Schold discloses an adhesive drywall tape wherein side edges of the drywall tape are buffed so that the side edges of the tape are thinner than the center of the tape whereby a finish coat of spackle can be applied over the side edges of the tape to obtain a smooth finish. In addition, Schold discloses a plastic bead on an inner or adhesive surface of the tape, the bead having raised portions for enhancing hinging action of the tape when the tape is applied to corner joints.

U.S. Pat. No. 1,039,363 to Chapin relates to an adhesive tape for joining abutting or adjacent edges or corners of paper boxes. The tape is formed of a narrow inner strip of tape and a wider outer strip of tape disposed over the inner strip. The inner and outer strips of tape are made of materials having different relative strengths, the inner strip being made of cloth and the outer strip being made of paper. The inner strip provides the primary staying power for securing the adjacent edges or corners while the outer strip hides and protects the inner strip and supplements the staying power of the inner strip. The outer strip also prevents the escape of adhesive on the inner strip, since such adhesive may be inclined to ooze through the inner strip.

None of the aforementioned patents recognize the significance of providing drywall tape with a non-uniform cross-section preventing the drywall tape from being drawn or sucked into the gaps and/or depressions formed at drywall joints. Furthermore, none of the aforementioned patents disclose an adhesive drywall tape utilizing a pre-applied yucca adhesive to reduce the time and materials required for wall finishing while providing an enhanced bond between the drywall tape and the drywall sheets. Applicators for facilitating the application of drywall tapes to drywall joints are also not disclosed by the aforementioned patents. In addition, the prior art does not teach the use of a yucca adhesive for securing drywall tape to sheets of drywall to save time and materials and to provide a better adhesive bond in wall finishing procedures.

In Costa Rica, yucca adhesive has been used as a poster adhesive and as a fabric starch. Until the present invention, however, the benefits and advantages of using yucca adhesive to secure drywall tape to sheets of drywall have not been recognized.

Accordingly, the need exists for an improved drywall tape having a configuration in cross-section to avoid drawing or sucking of the drywall tape into the gaps or grooves formed between abutting or adjacent edges of drywall sheets and/or into the depressions formed by adjacent or abutting "factory edges" of drywall sheets. The need further exists for drywall tapes, drywall tape applicators and methods of finishing drywall joints that eliminate the need for a "bedding coat" of joint compound, reduce the amount of joint compound to be applied over drywall tapes for "blocking" and "skimming", reduce the width of the band or stripe of joint compound to be applied for "blocking", reduce the amount of time required for drywall tapes to become adhesively bonded to drywall sheets, provide a more secure adhesive bond between drywall tapes and drywall sheets, reduce construction costs by reducing the amount of materials and labor required, reduce the level of skill and expertise required to obtain high quality finished drywall joints, reduce the messiness or sloppiness associated with wall finishing, eliminate the need for toxic, non-biodegradable and inorganic adhesives, avoid peeling of drywall tapes and cracking of finished drywall joints and/or allow drywall tapes to be efficiently and quickly applied to drywall joints without wrinkling and without the formation of bubbles under the tapes.

OBJECTS AND SUMMARY OF THE INVENTION

Accordingly, it is a primary object of the present invention to overcome the aforementioned disadvantages of conventional drywall tapes, conventional drywall tape adhesives and conventional wall finishing techniques.

Another object of the present invention is to occupy a portion of the depression, formed along a drywall joint by adjacent or abutting "factory edges" of drywall sheets, with a thickened portion of a drywall tape applied over the joint.

A further object of the present invention is to prevent drywall tape applied over a drywall joint from being drawn into the depression created by sloping outer surface portions of adjacent or abutting drywall sheets forming the drywall joint.

The present invention has as another object to prevent drywall tape applied over a drywall joint from being drawn into the gap or groove between adjacent or abutting edges of drywall sheets forming the joint.

It is also an object of the present invention to eliminate the need for joint compound to affix drywall tape to a drywall joint.

An additional object of the present invention is to reduce the amount of materials and time needed for wall finishing.

The present invention has as a further object to reduce the drying time for drywall tape.

Another object of the present invention is to reduce the amount of time required for drywall tape to become firmly adhered to drywall sheets.

A still further object of the present invention is to reduce the width of a band of joint compound applied over drywall tape during "blocking" to obtain an imperceptible finished drywall joint.

Yet another object of the present invention is to utilize a pre-applied yucca adhesive in an adhesive drywall tape.

The present invention also has as an object to utilize a yucca adhesive to secure drywall tape to sheets of drywall.

Additionally, it is an object of the present invention to reduce the number of steps required to finish drywall joints.

The present invention has as a further object to reduce the level of skill and expertise needed to obtain high quality, finished drywall joints.

Moreover, it is an object of the present invention to increase the ease with which drywall tape is applied to drywall joints.

Another object of the present invention is to provide a drywall tape applicator facilitating the application of adhesive and non-adhesive drywall tapes to drywall joints.

It is also an object of the present invention to facilitate the application of adhesive drywall tape to drywall joints without wrinkling of the drywall tape and/or the formation of air bubbles under the drywall tape.

Yet an additional object of the present invention is to utilize a drywall tape applicator to wet an adhesive pre-applied on drywall tape within the applicator and to dispense the drywall tape from the applicator for securement to sheets of drywall via the pre-applied adhesive.

Still a further object of the present invention is to utilize a drywall tape applicator to apply an adhesive to drywall tape within the applicator and to dispense the drywall tape from the applicator for securement to sheets of drywall via the adhesive.

Some of the advantages of the present invention are that the drywall tapes can be formed from the same type of paper as that used for conventional paper drywall tapes, the drywall tapes are positioned over drywall joints in the same manner as conventional drywall tapes, the drywall tapes may have adhesives pre-applied thereto without requiring release sheets over the adhesives, the drywall tapes are simpler and easier to use than adhesive drywall tapes including release sheets, the drywall tapes may be supplied in rolls of varying lengths, the pre-applied adhesive is in a dry, non-activated state prior to use and is placed in an activated state by exposure to water, a roll of the drywall tape may be submerged in water to place the pre-applied adhesive in the activated state, the yucca adhesive used in the present invention is inexpensive and easy to prepare, the yucca adhesive is natural, organic and biodegradable, the yucca adhesive provides increased stiffness and adhesion, the drywall tapes can be used on flat drywall joints as well as inside and outside corner drywall joints, the drywall tapes can be applied to drywall joints under various environmental conditions without impairment of the finished joints, peeling and cracking of the finished joints are avoided, damage to the finished joints due to expansion and contraction of the wall or walls is avoided, the quantity or concentration of the yucca adhesive can be varied to obtain a desired tack or adhesion, the drywall tape applicators can be manually or electrically powered, the drywall tape applicators can be used to apply drywall tapes, with or without pre-applied adhesives, to drywall joints, the applicators can be used to activate pre-applied adhesives on the drywall tapes and/or to apply adhesive to the drywall tapes, the applicators can be designed to accommodate different size rolls of drywall tapes, the applicators can be used to apply drywall tapes to vertical as well as horizontal drywall joints, and the applicators can be adjustable for ease of use.

These and other objects, advantages and benefits are achieved with the present invention as generally characterized in a drywall tape including a narrow, paper tape of uniform width and non-uniform thickness or cross-section. The tape has a central portion of greater thickness or cross-section and side portions of lesser thickness or cross-section, together defining the non-uniform thickness or cross-section. The tape includes an outer planar surface and a non-planar inner surface. In one embodiment, the central portion and the side portions of the tape are formed integrally, unitarily, as a single strip of tape. In another embodiment, the tape is formed of inner and outer strips. The tape has a width slightly less than the width of a shallow depression formed by sloping outer surface portions of the drywall sheets along the drywall joint. Accordingly, the tape occupies the depression but does not protrude beyond non-sloping outer surface portions of the drywall sheets when the tape is applied over the joint. In addition, the central portion of the tape fills an inner portion of the depression and prevents the tape from being drawn or sucked into the depression and/or the gap between the edges of the drywall sheets. The drywall tape can be supplied as a non-adhesive drywall tape, to which an adhesive is applied or contacted during use, or as an adhesive drywall tape, to which an adhesive is pre-applied prior to use.

When the drywall tape is supplied as an adhesive drywall tape according to the present invention, a coating of dry, non-sticky, inactivated yucca adhesive is disposed on the inner surface of the drywall tape. The adhesive becomes sticky, tacky or activated when wet to adhere to sheets of drywall when the drywall tape is applied over a drywall joint formed by adjacent or abutting edges of the drywall sheets, respectively. The adhesive dries rapidly and stiffens as it dries to adhesively secure the drywall tape to the drywall sheets over the drywall joint. The yucca adhesive can be supplied separately from the drywall tapes, such as being supplied in powder form to be mixed with water or being supplied in fluid form pre-mixed with water, for use with non-adhesive drywall tapes.

A drywall tape applicator for applying drywall tapes to drywall joints in accordance with the present invention includes a housing and a handle attached to the housing. The handle is preferably adjustable in length and preferably disconnectable from the housing. The housing is adapted to receive a roll of drywall tape therein. The housing includes a fluid reservoir adapted to receive either a fluid for activating a pre-applied adhesive disposed on the drywall tape, or a fluidic adhesive for being applied to the drywall tape. Where the drywall tape has an inactivated, pre-applied adhesive thereon, fluid is supplied to the reservoir for wetting and thereby activating the adhesive. Where the drywall tape does not already have an adhesive thereon, a fluidic adhesive is supplied to the reservoir for being imparted to the drywall tape. The roll of drywall tape is rotatable within the enclosure to unroll or unwind the drywall tape such that the drywall tape, which has the pre-applied adhesive thereon activated or which has been exposed to the fluidic adhesive, passes through an open end of the housing to be dispensed or extended externally from the housing. The handle may be manipulated by a wall finisher to apply the drywall tape over the entire length of a drywall joint as it is dispensed from the housing.

A method of finishing a drywall joint according to the present invention includes the steps of positioning a length of paper drywall tape over a drywall joint with a width of the drywall tape substantially centered over the joint, securing the drywall tape over the joint with a yucca adhesive along the entire length of the joint, allowing the yucca adhesive to dry, applying a thin layer of joint compound over the drywall tape to blend the drywall tape into non-sloping outer surface portions of the drywall sheets, respectively, forming the joint, allowing the joint compound to dry and sanding the joint compound.

Other objects and advantages of the present invention will become apparent from the following description of the preferred embodiments taken in conjunction with the accompanying drawings, wherein like parts in each of the several figures are identified by the same reference characters.

BRIEF DESCRIPTION OF THE DRAWINGS

FIG. 3 is a broken sectional view of the drywall joint.

FIG. 4 is a perspective view of the root of a yucca plant used to form a yucca adhesive for drywall tapes according to the present invention.

FIG. 5 is a broken sectional view of the drywall joint showing the adhesive drywall tape applied thereon.

FIG. 6 is a sectional view of a modification of the adhesive drywall tape according to the present invention.

DESCRIPTION OF THE PREFERRED EMBODIMENTS

Figure 2:
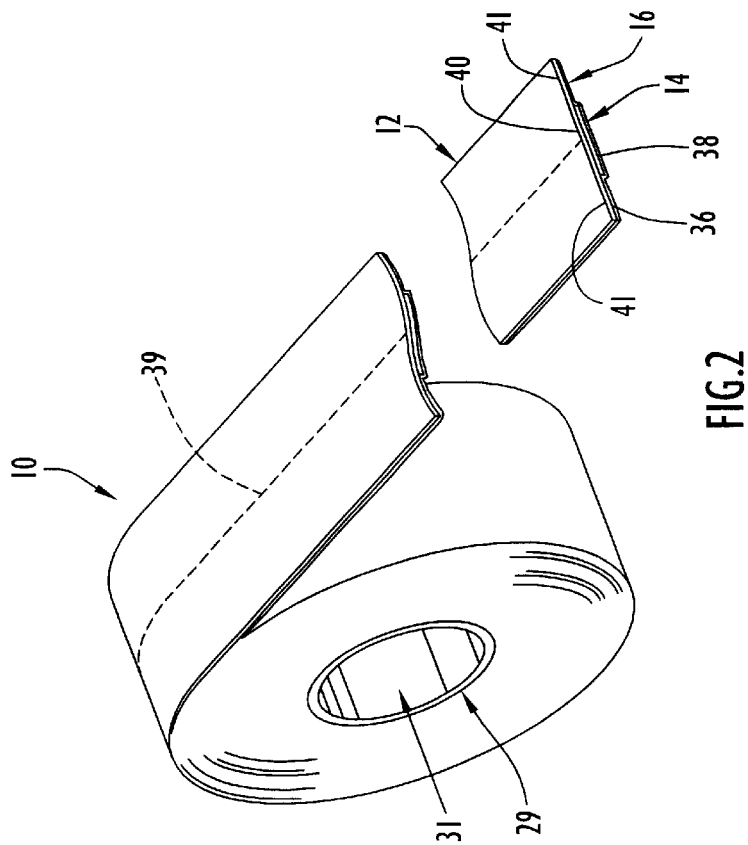
FIG. 2 is a broken perspective view of the adhesive drywall tape formed into a roll.
Figure 1:
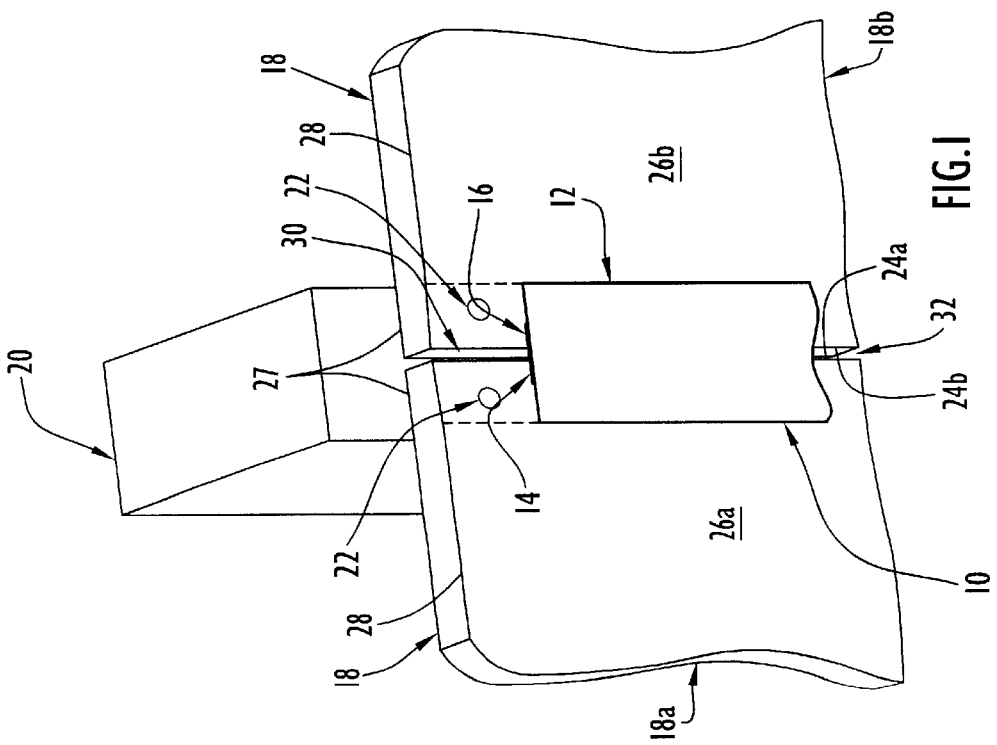
FIG. 1 is a broken perspective view illustrating an adhesive drywall tape according to the present invention applied over a drywall joint formed by adjacent sheets of drywall.

An adhesive drywall tape 10 according to the present invention is illustrated in FIGS. 1 and 2 and includes a narrow outer strip 12, a narrower inner strip 14 secured to outer strip 12 and a coating or layer of adhesive 16 disposed on an inner surface of tape 10. The adhesive drywall tape 10 is used in wall finishing to finish drywall joints formed by abutting or adjacent sheets or panels of drywall. As shown in FIGS. 1 and 3, conventional building construction involves securing drywall sheets 18 to underlying frame or support members, such as stud 20, via nails 22 or other securing elements. The drywall sheets 18 are typically available in a limited assortment of standard sizes, such as 4 feet×8 feet. As used herein, the term "drywall" encompasses sheet rock, gypsum board, plaster board and other similar products provided in relatively large sheets or panels for use as wall surfaces. In order to form a wall surface, drywall sheets 18 are typically secured to the underlying support or frame members in side-to-side, end-to-end and/or side-to-end relation.

FIGS. 1 and 3 show two drywall sheets 18a and 18b secured to stud 20 by nails 22 in side-to-side relation with side edges 24a and 24b of the drywall sheets 18a and 18b, respectively, adjacent or in abutment with one another. The adjacent or abutting side edges 24a and 24b form a drywall joint 30. Even though the drywall sheets 18a and 18b are preferably placed as close together as possible with the side edges 24a and 24b closely adjacent or in abutment with one another, a gap or groove 32 is presented between the side edges 24a and 24b along the joint 30. In addition, the drywall sheets 18a and 18b are provided with "factory edges" in that outer surfaces 26a and 26b of the drywall sheets 18a and 18b, respectively, include sloping outer surface portions 27 that slope inwardly or downwardly from non-sloping outer surface portions 28 to the side edges 24a and 24b such that a shallow depression 34 is formed along the drywall joint 30 as best shown in FIG. 3.

The outer and inner strips 12 and 14 are made of paper, such as that used in Sheetrock® Joint Tape of U.S. Gypsum Company, Chicago, Ill. The outer strip 12 is of uniform width, defined between side edges thereof, and uniform thickness, defined between planar outer and inner faces thereof. The width of the outer strip 12 is slightly less than the major or maximum width of depression 34, the major or maximum width corresponding to the width of depression 34 between the non-sloping outer surface portions 28. The non-sloping outer surface portions 28 are planar, and the major or maximum width of depression 34 is disposed in the plane of outer surface portions 28. In the case of tape 10, the outer strip 12 has a width of approximately 2 inches and has a minimal thickness. The inner strip 14 is of uniform width, defined between side edges thereof, and uniform thickness, defined between planar outer and inner faces thereof. In the case of tape 10, the inner strip 14 has a width approximately one-half the width of the outer strip 12 and has a thickness the same as the thickness of outer strip 12.

The outer face of inner strip 14 is secured or affixed to the planar inner face 36 of outer strip 12 with the inner strip 14 centered on the outer strip 12. Accordingly, the inner strip 14 covers a middle portion of the inner face 36 but does not cover lateral portions of inner face 36. The planar inner face 38 of inner strip 14 and the lateral portions of inner face 36 of outer strip 12 that are not covered by the inner strip 14 together form the inner surface, which is non-planar, of the adhesive drywall tape 10. The planar outer face of outer strip 12 defines an outer surface of the adhesive drywall tape 10. Accordingly, even though the inner and outer strips are each of uniform thickness, the drywall tape 10 formed thereby is of non-uniform thickness and, therefore, non-uniform cross-section. As shown in FIG. 2, the drywall tape 10 has a central portion 40 of greater thickness or cross-section and side portions 41 of lesser thickness or cross-section with the central portion 40 disposed between the side portions 41. In particular, the central portion 40 has a thickness corresponding to the combined thicknesses of the outer and inner strips while the side portions have a thickness corresponding to the thickness of the outer strip.

The inner strip 14 may be secured to the outer strip 12 in various ways, including the use of various adhesives. Where adhesive is used to secure the inner and outer strips to one another, the adhesive used may be the same as adhesive 16. The drywall tape 10 may have a crease or fold line 39, shown in dotted lines in FIG. 2, along its center line to facilitate bending or folding for use on outside and inside corner drywall joints. The drywall tape 10 may be supplied in various lengths, such as lengths ranging from 75 feet to 500 feet, and is preferably supplied in rolled form as shown in FIG. 2. The drywall tape 10 may be rolled around a rigid ring or tube 29 having a central opening 31 therethrough.

The coating or layer of adhesive 16 is disposed on the non-planar inner surface of the drywall tape 10, i.e., on the planar inner face 38 and the portion of planar inner face 36 not covered by inner strip 14, as a coating or layer of minimal thickness. The coating of adhesive 16 extends the entire width and length of the drywall tape 10. The adhesive 16 is pre-applied on tape 10 and, prior to use of tape 10 to finish drywall joints, is in a dry or inactivated state prior to being exposed to fluid. In the inactivated state, the adhesive 16 is not sticky or tacky and does not exhibit active adhesive properties. The adhesive 16 assumes an activated state when exposed to fluid, such as water. In order to activate the adhesive 16, the adhesive coating alone may be exposed to fluid, or the entire drywall tape 10 may be exposed to fluid, such as being submerged in fluid. In the activated state, the adhesive 16 becomes sticky, tacky and exhibits active adhesive properties and, in particular, is ready to adhere the drywall tape 10 to the outer surfaces 26a and 26b of drywall sheets 18a and 18b.

The adhesive 16 is a yucca adhesive, made from the edible root of the yucca plant. FIG. 4 illustrates a yucca root 42 used to make adhesive 16. The yucca root 42 grows in the ground in a manner similar to the potato. After being removed from the ground, the outer skin of the yucca root 42 is peeled off or removed to expose the "meat" or "flesh" of the yucca root. The "meat" or "flesh" of the yucca root 42 is grated, and the thusly grated "meat" or "flesh" is placed in a container of water. The grated "meat" or "flesh" is allowed to soak in the container of water for several hours and, preferably, overnight. After soaking, the water is drained and the wet yucca "meat" that remains is allowed to dry. Preferably, the wet yucca "meat" is placed in direct sunlight until all moisture has been removed therefrom. When sunlight is used for drying, the drying process will typically take two to three days to complete. It should be appreciated, however, that the wet yucca "meat" can be dried in alternative ways including artificial drying processes. As an example, the wet yucca "meat" may be dried with the use of lamps. After drying, the yucca adhesive 16 remains in powder form, the yucca adhesive 16 having been easily and inexpensively produced from a naturally occurring plant without any additives except water.

The adhesive 16, when used as a pre-applied adhesive for drywall tape 10, is applied in a thin layer or coating to the inner surface of the drywall tape 10. Accordingly, the yucca adhesive 16 is applied to the inner face 38 of inner strip 14 and to the portion of inner face 36 of outer strip 12 that is not occupied or covered by inner strip 14. The yucca adhesive 16 may be applied to the inner surface of the drywall tape 10 in accordance with various conventional adhesive application techniques. As best shown in FIG. 2, the adhesive 16 is preferably applied in a layer or coating of uniform thickness over the entire inner surface of the drywall tape. The yucca adhesive 16, in addition to being pre-applied to a drywall tape, may be used instead of joint compound as a non-pre-applied adhesive to secure drywall tape to sheets of drywall as discussed further below. It should be appreciated that the quantity or concentration of the yucca adhesive 16 applied to the drywall tape can be adjusted in order to obtain a desired tack for the drywall tape when the adhesive 16 is moistened or wet. Preferably, the tack of the adhesive 16, when moistened or wet, is sufficiently strong to prevent undesired displacement or sliding of the drywall tape along the drywall sheets while allowing for the removal of wrinkles and/or air bubbles. It should also be appreciated that other types of adhesives can be pre-applied to drywall tape 10 and that drywall tape 10 can be used without pre-applied adhesives.

In a method of wall finishing according to the present invention, the adhesive drywall tape 10, which is supplied in rolled form as shown in FIG. 2, is submerged in water for a short period of time until the adhesive 16 becomes moist or wet and, therefore, becomes activated. Where the entire roll of adhesive drywall tape 10 is to be used, the entire roll may be submerged in water. Where less than the entire roll of tape is to be used, a desired length of tape can be cut from the roll for submersion of the desired length of tape in water. The adhesive drywall tape 10 will then be ready to be directly applied to the drywall sheets 18a and 18b over joint 30 without the application of a "bedding coat" of joint compound.

As shown in FIGS. 1 and 5, a free end of the drywall tape 10 is centered over joint 30 with the inner surface of the drywall tape facing the outer surfaces 26a and 26b of the drywall sheets 18a and 18b, respectively, the end of the drywall tape being positioned at a first end of the joint. In the case of a vertical drywall joint, as for drywall joint 30, the free end of the drywall tape is typically positioned at the top or upper end of the drywall joint. For the sake of clarity, FIG. 1 illustrates the free end of drywall tape 10 positioned slightly below upper edges of drywall sheets 18a and 18b, respectively; however, the free end of drywall tape 10 may be aligned with the upper edges as shown in dotted lines in FIG. 1. With the free end centered over joint 30, the free end is moved toward the drywall sheets 18a and 18b to place the adhesive 16 on the inner surface of drywall tape 10 into contact with outer surfaces 26a and 26b. The free end of tape 10 is pressed against the drywall sheets, and the tackiness of adhesive 16 causes the free end of drywall tape 10 to adhere to drywall sheets 18a and 18b. Working from top to bottom, the drywall tape 10 is applied over the remainder of joint 30 in a similar manner. The drywall tape 10 is applied to the entire length of joint 30, the drywall tape 10 being unrolled as it is applied. Once a second end of the joint has been reached, i.e. the bottom or lower end for joint 30, the drywall tape 10 is cut so as to terminate at the second or lower end of joint 30. During and/or shortly following application to joint 30, the drywall tape 10 may be smoothed to remove wrinkles and/or air bubbles while the tackiness of adhesive 16 prevents undesired displacement, slipping and/or sliding of the drywall tape 10 along the drywall sheets. The adhesive 16 dries quickly, typically a few hours, and stiffens as it dries. In just a short amount of time, the adhesive 16 is sufficiently stiff to firmly bond the drywall tape 10 to the drywall sheets 18a and 18b. When completely dry, the adhesive 16 achieves its maximum stiffness and securely bonds the drywall tape 10 to the drywall sheets 18a and 18b.

Once the adhesive 16 has sufficiently dried, the joint 30 is "blocked" by applying a layer or coat of joint compound over the drywall tape 10 along the entire length of joint 30. For drywall tape 10, which is approximately 2 inches in width, the layer or coat of joint compound is applied over tape 10 in a band or stripe approximately 6 to 8 inches or less in width centered or substantially centered over drywall tape 10. The "blocking" layer of joint compound is applied in a manner to blend the drywall tape 10 into the outer surfaces 26a and 26b and, in particular, the non-sloping outer surface portions 28, of the drywall sheets. In accordance with the present invention, the joint compound is applied during "blocking" in a relatively narrow band or stripe since the drywall tape 10, prior to "blocking", is already flush or substantially flush with non-sloping outer surface portions 28. The joint compound is allowed to dry and, if necessary, a thin, "skimming" coat or layer of joint compound is applied to the joint 30 to finish blending the drywall tape 10 into the outer surface portions 28. After the joint compound has dried, the joint 30 is cleaned and sanded. A decorative, final wall finish such as paint or wallpaper, is then applied to the outer surfaces of the drywall sheets and to joint 30.

With the drywall tape 10 secured to the drywall sheets 18a and 18b as best shown in FIG. 5, the drywall tape 10 bridges the gap or groove 32, and the inner strip 14 is completely disposed in an inner portion of depression 34. The full width of the outer strip 12 is disposed within an outer portion of depression 34, the width of the outer strip 12 being disposed slightly within or inside of the major or maximum width of depression 34. The outer face of outer strip 12 is aligned or co-planar with or is substantially aligned or co-planar with outer surface portions 28. Accordingly, the outer strip 12 including the side edges thereof, does not protrude beyond the plane of outer surface portions 28 and is flush or substantially flush with outer surface portions 28. The inner strip 14 prevents the outer strip 12 from being drawn or sucked into the gap or groove 32 and/or the depression 34. Since the entire width of inner strip 14 is disposed within the width of the lower portion of depression 34, i.e. within or inside of an intermediate width of depression 34 less than the major or maximum width, the presence of inner strip 14 does not cause the outer strip 12 to protrude beyond the outer surface portions 28. The adhesive 16 is of increased strength and stiffness, thereby reducing the amount of adhesive needed to secure the drywall tape 10 to the drywall sheets. Accordingly, the yucca adhesive 16 is disposed on the drywall tape 10 as a coating or layer of minimal thickness so that the drywall tape 10 lays as flush as possible with the outer surface portions 28. The side edges of outer strip 12 are therefore as flush as possible with outer surface portions 28, respectively. Accordingly, the width and thickness of the layer of joint compound applied for "blocking" is substantially reduced. In addition, the need for a "skimming" coat of joint compound may be eliminated; or, where a "skimming" coat of joint compound is used, the amount of joint compound used for "skimming" is substantially reduced. The yucca adhesive 16, when dry, provides an enhanced bond to avoid peeling of the drywall tape 10 and/or cracking or buckling of the finished joint due to expansion and contraction of the wall surface and/or changes in ambient temperature.

The method of wall finishing according to the present invention reduces the skill and expertise needed to obtain a high quality finished drywall joint. In particular, the drywall tape of the present invention does not have to be applied over a "bedding" coat of joint compound since the drywall tape 10 already carries the necessary amount of adhesive. The drywall tape 10 lays as flush as possible with the non-sloping outer surface portions of the drywall sheets so that less expertise and finesse are required to blend the drywall tape 10 imperceptively with the non-sloping outer surface portions of the drywall sheets. Construction costs are reduced with the drywall tape of the present invention due to the time and materials saved as well as the low cost of the yucca adhesive. Repair and maintenance costs are also reduced since drywall joints finished in accordance with the present invention resist cracking, peeling and/or buckling. Although the drywall tape 10 has been described herein as being applied to the joint from the top to the bottom of the joint, it should be appreciated that the drywall tape 10 can be applied to a vertical joint from the bottom to the top of the vertical joint.

An alternative adhesive drywall tape according to the present invention is illustrated at 110 in FIG. 6. Adhesive drywall tape 110 is representative of a drywall tape formed unitarily, integrally as a single strip of non-uniform thickness or cross-section. Drywall tape 110 includes a strip 113 of paper, such as the paper used for outer and inner strips 12 and 14. The strip 113 is of non-uniform thickness or cross-section including a central portion 140 of greater or increased thickness or cross-section and side portions 141 of decreased or lesser thickness or cross-section. The central portion 140 merges with the side portions 141 via gently curving connecting portions 145. The strip 113 has a width between side edges thereof that is slightly less than the major or maximum width of the depression formed by adjacent or abutting "factory edges" of drywall sheets. The central portion 140 has a width, between connecting portions 145, approximately one half the width of strip 113. The strip 113 has a non-planar inner face 137, corresponding to the inner surface of the drywall tape 110, and has a planar outer face, corresponding to the outer surface of the drywall tape 110. A layer or coating of yucca adhesive 116, which is the same as adhesive 16, is disposed on the inner face 137.

When the adhesive drywall tape 110 is applied to a drywall joint, the width of central portion 140 is disposed within the width of the lower portion of the depression formed by adjacent or abutting "factory edges" of drywall sheets forming the corresponding drywall joint, and the width of strip 113 is disposed within the major or maximum width of the depression. The planar outer face of strip 113 is thus co-planar or substantially co-planar with the non-sloping outer surface portions of the drywall sheets. It should be appreciated that the central portion 140 may have a curved or arcuate surface along inner face 137, or the inner face 137 may be composed of planar or straight surfaces.

Figure 7:
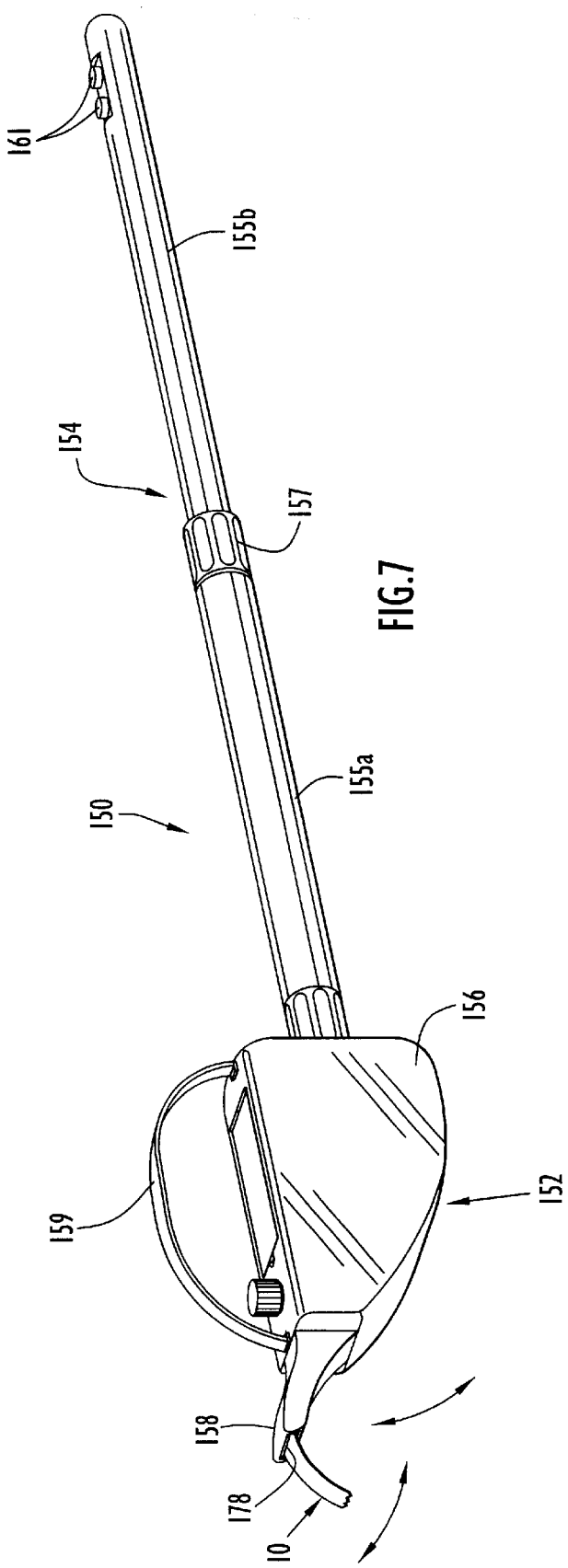
FIG. 7 is a perspective view of a drywall tape applicator according to the present invention illustrating use of the applicator with the adhesive drywall tape.
Figure 8:
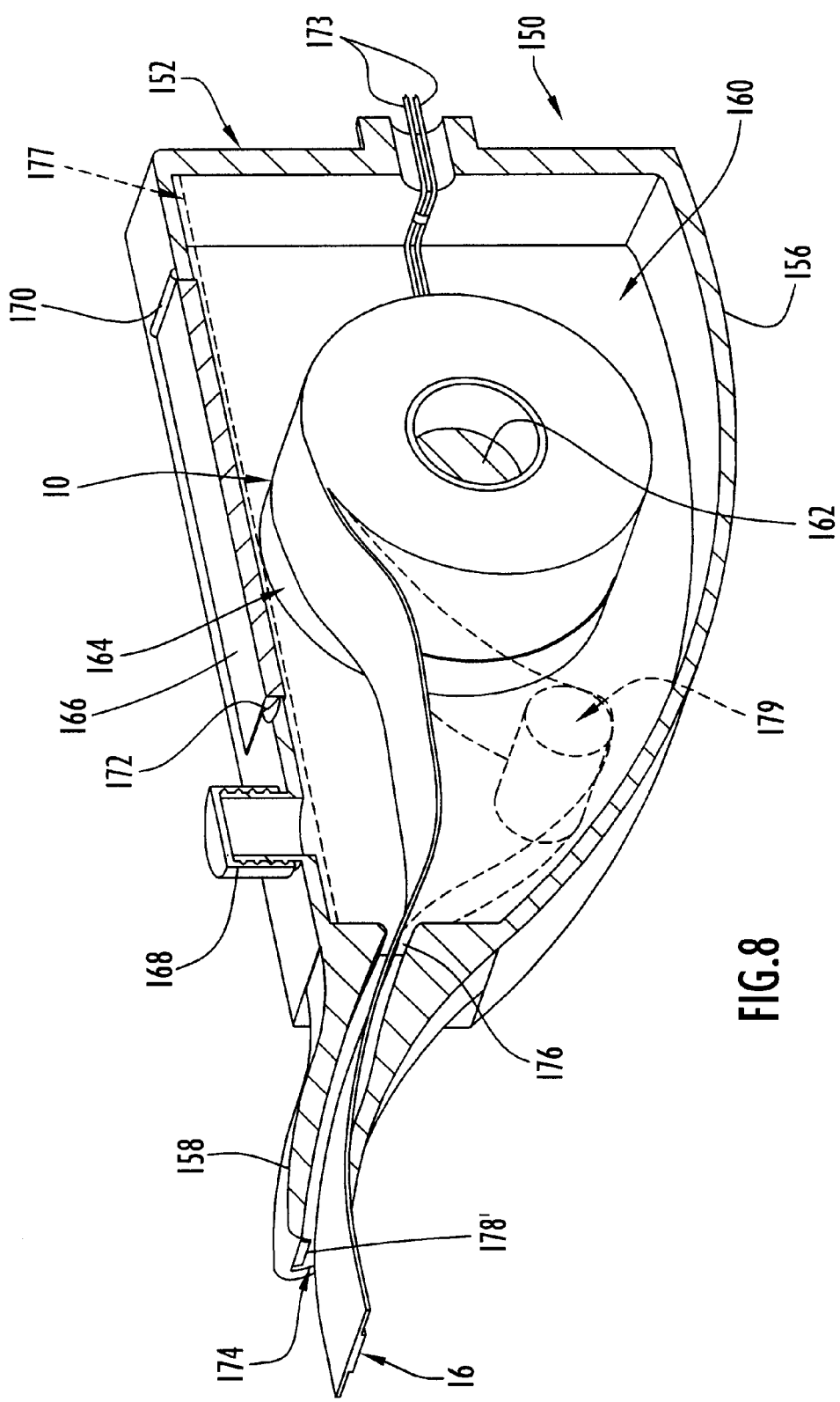
FIG. 8 is a broken view, partly in section, of a housing of the applicator.

FIG. 7 illustrates a drywall tape applicator 150 for applying drywall tape to drywall joints. The applicator 150 includes a housing 152 and a handle 154 attached to housing 152. Housing 152 includes a body or enclosure 156 for receiving drywall tape therein and a pivotable guide member 158 for dispensing drywall tape from enclosure 156. As shown in FIG. 8, enclosure 156 encloses a fluid reservoir 160, a rotatable spindle or shaft 162 disposed in fluid reservoir 160 and a motor 164 for driving shaft 162. Fluid reservoir 160 may be of a size to accommodate a roll of drywall tape of maximum length, for example 500 feet. The applicator 150 may be provided with enclosures of different sizes to accommodate different size rolls of drywall tape. Shaft 162 is rotatably mounted in enclosure 156 to extend in a transverse direction in fluid reservoir 160. The shaft 162 is coupled to motor 164 in a manner to be rotated thereby to correspondingly rotate a roll of drywall tape, such as the roll of drywall tape 10, disposed on shaft 162. Since the motor 164 is disposed in the fluid reservoir 160, which is adapted to receive fluid such as water or a fluidic adhesive, the motor 164 is preferably provided with suitable fluid-tight seals and/or is disposed in a fluid-tight case. The enclosure 156 is provided with a door 166 providing access to fluid reservoir 160. The door 166 is hingedly mounted to a top wall of enclosure 156 by a hinge 170 and is provided with a releasable lock or detent 172 for releasably locking the door 166 in a closed position. The enclosure may be provided with an opening communicating with fluid reservoir 160 and closed by a removable cap 168. The cap 168 is internally threaded for removable, threaded engagement with an externally threaded neck provided on the top wall of enclosure 156, the neck circumscribing the opening. The opening, which is exposed when the cap 168 is removed from the neck, allows fluid to be introduced into the fluid reservoir 160. However, the opening is not necessary since fluid can be supplied to the reservoir 160 via the door 166.

The motor 164 is an electric motor that is isolated or sealed off from fluid contained in fluid reservoir 160. The motor 164 may be powered by batteries disposed in handle 154, and/or the applicator 150 may be provided with a plug for reception in an electrical outlet to transmit electricity to motor 164. Using battery power to power the motor 164 is advantageous where no alternate source of electricity is available, such as in unelectrified buildings. The motor 164 is electrically coupled to a source of electric power by electrical wiring 173, which is also sealed, insulated or isolated from fluid in reservoir 160.

The guide member 158 protrudes from a forward wall of enclosure 156 and has an open forward end 174 defining an open end of the housing, an open rearward end 176 communicating with the fluid reservoir 160, and an open interior between the forward and rearward ends. The rearward end 176 of the guide member is rotatably, pivotably or hingedly mounted to the front of enclosure 156 to be capable of rotational, pivotal or hinged action, as represented by arrows in FIG. 7, when pressure is applied to the forward end 174 of the guide member. As shown by the arrows in FIG. 7, the guide member 158 is capable of rotating, pivoting or hinging in up and down and side to side directions. The rearward end 176 of the guide member can be rotatably, pivotably or hingedly mounted to the front of enclosure 156 in many various ways, such as with pivot pins or shafts, hinges, by configuring the rearward end of the guide member to cooperate or mate with a socket formed in the enclosure and/or by forming the guide member of resilient or flexible material. For example, the rearward end of the guide member can be formed as a ball or universal joint for reception in a corresponding socket in enclosure 156. In the case of applicator 150, the guide member 158 is made of resilient, flexible material, such as rubber or plastic, allowing the guide member 158 to bend, flex, pivot or rotate in response to pressure or force applied thereto.

The handle 154 is made up of first and second tubular or hollow handle sections 155a and 155b, the handle section 155b being telescopically received in handle section 155a. The handle 154 is adjustable in length via rotation of collar 157 coupling the handle sections 155a and 155b in telescoping relation. In particular, the collar 157 is rotatable in a first direction to unlock the handle sections, thusly permitting handle section 155b to be extended or retracted relative to handle section 155a. The collar 157 is rotatable in a second, opposite direction to lock the handle sections 155a and 155b relative to one another to obtain a desired length for handle 154. The handle 154 is releasably connected to housing 152, the first handle section 155a being releasably coupled to a back or rear wall of enclosure 156. If desired, the enclosure may include a hand grip 159, as shown in FIG. 7, to facilitate grasping of housing 152 for use of housing 152 to apply drywall tape to drywall joints when handle 154 is disconnected from housing 152 as discussed further below. Switches 161 and, in particular, on and off switches 161, are disposed on the handle 154 for operating motor 164. Electrical wiring and other components for supplying electric power to motor 164 is/are disposed in the interior of handle 154.

In order to use applicator 150 to apply adhesive drywall tape, such as adhesive drywall tape 10, to drywall joints, the door 166 of housing 152 is opened, and the roll of drywall tape 10 is placed on shaft 162. The roll of drywall tape 10 may be frictionally secured on shaft 162 or may be manually secured to shaft 162, such as by being splined to shaft 12 or with the use of keys and keyways. The free end of drywall tape 10 is passed through guide member 158 to protrude externally from the open forward end 174 of the guide member, and the door 166 is closed. The cap 168 is removed from the housing 152, and water is introduced into the fluid reservoir 160. The fluid reservoir 160 may be filled with water such that the entire roll of drywall tape 10 is submerged therein as shown by water level 177 in dotted lines in FIG. 8. However, it is not necessary that the fluid reservoir 160 be filled with water in that it is only necessary that sufficient water be provided in fluid reservoir 160 so that the drywall tape passes therethrough prior to being dispensed from the guide member when the roll of drywall tape is rotated by shaft 162.

It should be appreciated that one or more spindles or rollers may be provided in the enclosure for guiding movement of the drywall tape therethrough. Such one or more spindles or rollers can be arranged in the enclosure to obtain a desired path of movement of the drywall tape therethrough. In particular, the drywall tape can be guided by the one or more spindles or rollers to pass through a minimum level of fluid in the reservoir. In this manner, the amount of fluid that needs to be in the reservoir to ensure contact with or exposure to the drywall tape is minimized. In addition, fluid in the reservoir does not have to be frequently replenished as the supply of fluid is used up or depleted. As shown in dotted lines in FIG. 8, a spindle or roller 179 may be mounted in reservoir 160 to extend in a transverse direction. The drywall tape 10 may be guided by the spindle 179 to pass through the bottom of reservoir 160 such that the drywall tape 10 is passed through the fluid in reservoir 160 even when the water level 177 is significantly lowered.

Once sufficient water has been supplied to the fluid reservoir 160, the cap 168 is replaced. The switch 161 corresponding to the "on" mode is pressed, causing shaft 162 to be rotated by motor 164. In response to rotation of shaft 162, the roll of drywall tape 10 is correspondingly rotated, the roll of drywall tape 10 being rotated by shaft 162 in a direction to unroll or unwind the roll of drywall tape. Accordingly, the drywall tape 10 is advanced through the guide member 158 and is dispensed from the forward end 174 of the guide member.

The drywall tape 10 is advanced or dispensed until the portion of drywall tape presented at the forward end 174 has the coating of adhesive 16 thereon activated. The adhesive 16 is activated due to the drywall tape 10 being submerged in water in fluid reservoir 160 and/or due to passage of the drywall tape 10 through water in the fluid reservoir 160 prior to the drywall tape exiting the guide member 158. Accordingly, adhesiveness or adhesive properties is/are imparted to the dry wall tape prior to or as it is being dispensed from the applicator. Once the adhesive 16 of the drywall tape 10 presented at the forward end 174 of the guide member 158 has been activated, the switch 161 corresponding to the "off" mode is pressed to terminate rotation of shaft 162 by motor 164, or the motor can be deactivated or turned off merely by releasing manual pressure on the switch corresponding to the "on" mode. Alternatively, a single switch 161 can be used for both the "on" and "off" modes.

The free end of drywall tape 10 extending from the guide member 158 is cut to remove the portion of drywall tape 10 that was not exposed to water in the fluid reservoir prior to exiting through the guide member. The portion of drywall tape 10 along which the adhesive 16 is inactivated is thusly removed, presenting a new free end protruding externally from the open forward end 174 of guide member 158. The new free end has the adhesive 16 thereon activated, and the applicator 150 and the drywall tape 10 are ready to be used to finish drywall joints. It should be appreciated that the free end of the drywall tape does not have to be manually extended externally from the guide member prior to actuation of the motor. Rather, the free end can remain within the fluid reservoir and can be guided by one or more spindles, rollers, sprockets or other structure to exit the guide member as the shaft is rotated. In this way, the free end of the drywall tape initially dispensed from the guide member will have the adhesive thereon activated such that no cutting of the drywall tape is necessary prior to use.

The handle 154 is grasped by a wall finisher, and the free end of drywall tape 10 extending externally from the guide member 158 and having the adhesive 16 thereon activated is positioned at an end, such as the top or upper end, of a drywall joint, such as drywall joint 30. The handle 154 is manipulated to center the drywall tape 10 over the joint 30 as previously described above. Via manipulation of the handle 154, the wall finisher moves the guide member 158 toward the outer surfaces 26a and 26b of the drywall sheets 18a and 18b, respectively, forming the joint 30 such that the inner surface of the free end of the drywall tape contacts the outer surfaces of the drywall sheets while remaining centered over the joint. The guide member 158 may be pivoted via manipulation of handle 154 by the wall finisher and contact of the guide member forward end 174 with the drywall sheets. In this manner, the forward end 174 of the guide member can be used to apply pressure to the free end of the drywall tape to press the free end of the drywall tape 10 against the outer surfaces of the drywall sheets. The tackiness of yucca adhesive 16 is strong enough to secure the free end of the drywall tape to the outer surfaces of the drywall sheets so that the motor 164 can be turned on via the appropriate switch 161 to advance and simultaneously apply the drywall tape 10 along the entire length of joint 30. In particular, as the drywall tape 10 is extended or dispensed externally from the forward end 174 of the guide member 158 due to rotation of shaft 162 by motor 164, the handle 154 is manipulated by the wall finisher to move the guide member 158 downwardly along the length of the joint so that drywall tape being extended externally from the guide member is applied to the drywall sheets along the entire length of the joint. As the drywall tape 10 is being extended from the forward end 174 of the guide member 158, the forward end 174 is held close to the outer surfaces of the drywall sheets and is angled or pivoted as necessary in order to ensure that the inner surface of the drywall tape makes good contact with the outer surfaces of the drywall sheets, the forward end 174 being used to press the drywall tape against the drywall sheets. Once the lower or bottom end of the joint 30 has been reached, the drywall tape 10 is cut. The drywall tape 10 remaining in applicator 150 may then be applied to another drywall joint.

It should be appreciated that the applicator 150 may be used to apply drywall tape to both vertical and horizontal joints. Where vertical joints are being finished, the applicator can be used to apply drywall tape thereto from top to bottom as described above or from bottom to top. For example, the roll of drywall tape 10 can be inverted from the position shown in FIG. 8, such that the drywall tape is dispensed from the guide member with the adhesive facing upwardly. In the latter case, the drywall tape is dispensed from the applicator in a manner that is advantageous for finishing joints from the bottoms to the tops of the joints.

The handle of the applicator may be extended and retracted manually, as described for handle 154, or mechanically or electrically via a mechanism disposed in or on the handle. For example, suitable mechanical and electrical mechanisms or components may be disposed within the handle 154 for extending and/or retracting the handle section 155b relative to the handle section 155a in response to activation of a switch on the handle 154. In the latter case, one of the switches 161 may be used for both the "on" and "off" modes while the other switch 161 may be used to operate the mechanism for extending and/or retracting the handle 154. Of course, a separate, additional switch may be provided in or on the applicator for effecting extension and retraction of the handle. Various mechanical mechanisms, motors and electrical components may be used in applicator 150 to provide mechanical or powered extension and retraction of the handle 154.

As pointed out above, the guide member 158 does not need to be mechanically, rotatably, pivotably or hingedly mounted to the enclosure 156. Rather, the guide member 158 may be made capable of rotating, pivoting or hinging action due to the construction of guide member 158 from resilient or flexible material to render the guide member 158 capable of bending, flexing, pivoting, rotating or hinging action when pressure or force is applied thereto during use, such pressure or force being applied during use by pressure of the guide member 158 and, in particular, the forward end 174, against the outer surfaces 26a and 26b of the drywall sheets. The enclosure, and preferably the entire housing, is washable or cleanable to remove adhesive therefrom subsequent to use.

Although the applicator 150 has been described and illustrated with an adhesive drywall tape, i.e. drywall tape having an adhesive pre-applied thereto, it should be appreciated that the applicator 150 can be used to apply non-adhesive drywall tapes, i.e. drywall tapes without pre-applied adhesives, to drywall joints. For example, a roll of non-adhesive drywall tape may be mounted on shaft 162, and the reservoir 160 may be supplied with a fluidic adhesive. In this way, the drywall tape becomes coated with the fluidic adhesive prior to being dispensed from the guide member, and the drywall tape that is dispensed from the guide member is ready to be applied to a drywall joint. Accordingly, adhesiveness or adhesive properties is/are imparted to a non-adhesive drywall tape prior to or as it is being dispensed from the applicator.

The applicator 150 may be provided with a blade for cutting the adhesive drywall tape, such as when the end of a joint has been reached. As an example, an upper edge of the forward end 174 of guide member 158 may be formed as or provided with a cutting blade 178, as shown in FIG. 7. The cutting blade 178 is used to cut the drywall tape 10, after having been applied to a drywall joint, by pivoting, rotating or angling the guide member 158 via manipulation of the handle 154 causing blade 178 to contact and cut the drywall tape 10. The amount or extent to which the guide member 158 is rotated, pivoted or angled in order to cut the drywall tape with blade 178 is greater than the amount or extent to which the guide member 158 is rotated, pivoted, hinged or angled when the drywall tape 10 is being applied to the drywall joint. In this manner, the drywall tape 10 is not inadvertently cut by the blade 178 when the drywall tape 10 is being applied to the drywall joint. As another example, the applicator 150 may be provided with a mechanically powered cutter. For instance, a mechanically powered cutting blade 178' may be disposed on the upper edge of forward end 174 as shown in FIG. 8. The cutting blade 178' is normally disposed in a non-cutting position within the guide member 158 and may be selectively moved to a cutting position wherein the blade 178' is exposed from the guide member 158 to contact and thusly cut the drywall tape 10. FIG. 8 illustrates the cutting blade 178' being moved from the non-cutting position toward the cutting position but prior to obtaining the cutting position, the blade 178' being shown in FIG. 8 between the non-cutting and cutting positions. Various mechanical and/or electrical mechanisms or components may be used to operate the cutting blade 178', and one of the switches 161 may be used to activate such mechanisms or components to obtain the cutting and non-cutting positions for the cutting blade 178'.

The housing 152 may be used to dispense the drywall tape when the housing 152 is disconnected from handle 154. Use of housing 152 to apply drywall tape to drywall joints is facilitated by the hand grip 159, which allows the housing 152 to be manually grasped and manipulated by the wall finisher.

The applicator 150, with or without handle 154, may be adapted for manual or non-powered use. For example, the shaft 162 may be free to rotate within enclosure 156 when a pulling force is applied to the drywall tape extending externally from the forward end of the guide member 158. In response to such force, the roll of drywall tape and the shaft 162 will rotate allowing the drywall tape to unroll or unwind. Accordingly, when the free end of the drywall tape extending externally from the guide member 158 is applied over a drywall joint with the adhesive of the free end in contact with the outer surfaces of the drywall sheets forming the drywall joint, the guide member 158 need only be moved downwardly, for finishing a vertical drywall joint from top to bottom, to unroll or unwind the drywall tape to further extend or advance the drywall tape externally from the guide member 158. The shaft 162 can be designed to rotate in response to minimal force being applied to the drywall tape. The tackiness of yucca adhesive 16 is strong enough to ensure that the free end of the drywall tape applied at the beginning of the joint is secured sufficiently to the drywall sheets to allow the guide member 158 to be moved longitudinally along the joint to unroll or unwind the drywall tape. As another example, the roll of drywall tape need not be secured to shaft 162, in which case the shaft 162 may be rigidly mounted in the enclosure 156 with the roll of drywall tape being rotatable around the shaft 162. The drywall tape may then be unrolled or unwound merely by applying a pulling force to the drywall tape that extends externally from the forward end of the guide member 158. It should be appreciated from the above that the applicator 150, therefore, does not need to be provided with a motor 164 where only manual application of the drywall tape is desired.

Figure 9:
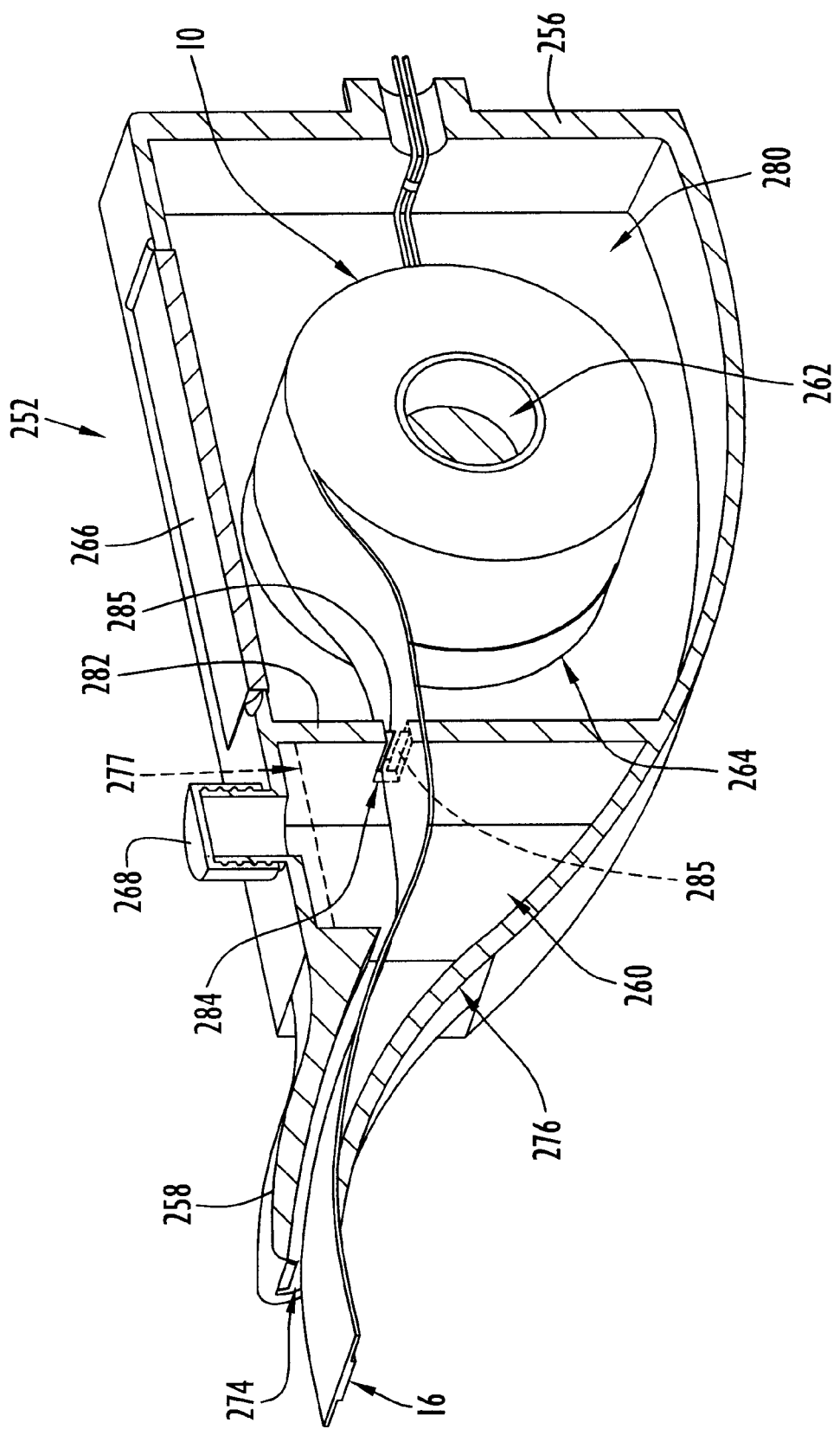
FIG. 9 is a broken view, partly in section, of a modified housing for the applicator.

A modification of a drywall tape applicator according to the present invention is illustrated in FIG. 9, only the housing 252 for the modified applicator being shown. Housing 252 is similar to housing 152 except that motor 264 is disposed in a motor compartment 280 of enclosure 256, the motor compartment being separate from the fluid reservoir 260. Access door 266 provides access to the interior of motor compartment 280 allowing a roll of drywall tape, such as adhesive drywall tape 10, to be disposed on shaft 262. An interior wall or partition 282 separates or isolates motor compartment 280 from fluid reservoir 260, which is in communication with the open rearward end 276 of guide member 258. The cap 268 is removable from enclosure 256 to allow fluid to be introduced in fluid reservoir 260 as represented in FIG. 9 by water level 277. A slot or opening 284 is provided in wall 282, and the drywall tape 10 passes from the motor compartment 280 into the fluid reservoir through the opening 284. The opening 284 may be provided with seals 285 to prevent leakage of fluid from fluid reservoir 260 into motor compartment 280. The drywall tape 10 passes from fluid reservoir 260 through the guide member 258 to protrude externally from the forward end 274.

As the drywall tape 10 is unrolled or unwound, the drywall tape 10 is passed through fluid in the fluid reservoir 260. Thereafter, the drywall tape 10 passes from the fluid reservoir 260 through the guide member 258 such that a portion of drywall tape 10 presented at the forward end 274 has the adhesive thereon activated. Accordingly, the modified applicator does not require that the entire roll of adhesive drywall tape be exposed to fluid since the drywall tape merely passes through the fluid in the fluid reservoir as it is being dispensed or extended externally of the housing. Where a non-adhesive drywall tape is dispensed from housing 252, the fluid reservoir 260 is supplied with a fluidic adhesive through which the non-adhesive drywall tape passes prior to being dispensed externally from the guide member 258.

Figure 10:
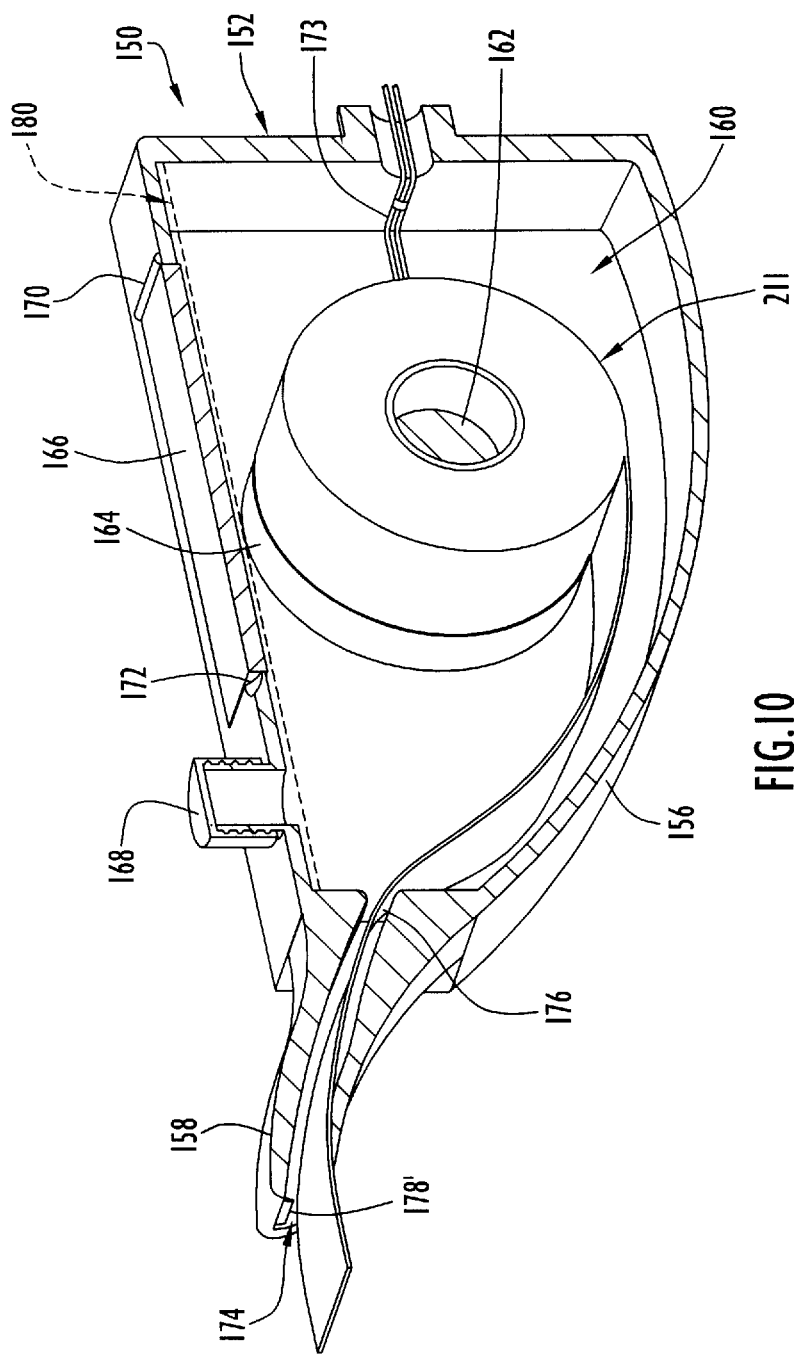
FIG. 10 is a broken view, partly in section, of the housing of the applicator illustrating use thereof with a non-adhesive drywall tape.

FIG. 10 illustrates drywall tape applicator 150 used to dispense a non-adhesive drywall tape for application to a drywall joint, the applicator 150 being illustrated in FIG. 10 without handle 154. A roll of non-adhesive drywall tape 211 is shown disposed on shaft 162 as described above for applicator 150 and adhesive drywall tape 10; however, the roll of drywall tape 211 is inverted from the position shown in FIG. 8 for the roll of drywall tape 10. The drywall tape 211 is a conventional paper drywall tape, such as Sheetrock® Joint Tape of U.S. Gypsum Company, of uniform thickness or cross-section and without adhesive pre-applied thereto. The drywall tape 211 has adhesive properties imparted thereto in response to being moved through the enclosure 156. Whereas the drywall tape 10 is passed through fluid in enclosure 156 to activate a pre-applied adhesive on the drywall tape, the drywall tape 211 is passed through a fluidic or viscous adhesive in enclosure 156 to become coated or saturated with such adhesive. In particular, a fluidic or viscous adhesive is supplied to reservoir 160, as represented by fluidic adhesive level 180, through which the tape 211 passes prior to being dispensed from guide member 158 as described above. The tape 211 passes through the bottom of reservoir 160 and, accordingly, is exposed to the fluidic adhesive even when the level of the fluidic adhesive is substantially reduced.

The fluidic adhesive used with drywall tape 211 is preferably yucca adhesive 16 in a fluidic or viscous form made by combining the yucca adhesive 16, in powder from, with water. Of course, the amount of water combined with the yucca adhesive 16, in powder form, to transform the yucca adhesive to viscous or liquid form can be adjusted to obtain a desired adhesive strength and/or consistency. For example, by varying the amount of water added to the yucca adhesive in powder form, the yucca adhesive in fluidic or viscous form can have a consistency ranging from a free flowing fluid to a thick paste. The yucca adhesive can be supplied in the powder form for being mixed with water prior to use to a desired consistency. Alternatively, the yucca adhesive can be supplied in the viscous or fluidic form with the powder form pre-mixed with water. The yucca adhesive, supplied as either a powder or a fluid, can be used, with or without a drywall tape applicator, in place of joint compound to secure various types of conventional drywall tapes to sheets of drywall.

Figure 11:
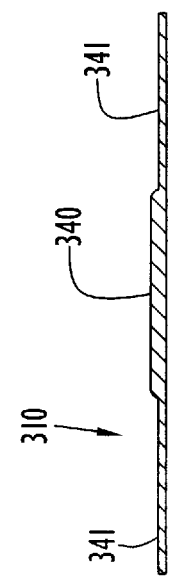
FIG. 11 is a broken perspective view of a non-adhesive drywall tape according to the present invention.

FIG. 11 illustrates at 310 a modified drywall tape according to the present invention. The drywall tape 310 is a non-adhesive drywall tape and is the same as drywall tape 110 without the adhesive 116 pre-applied thereon. Drywall tape 310 has central portion 340 and side portions 341 formed integrally, unitarily as a single strip of paper of non-uniform thickness or cross-section. The drywall tape 310 can be applied to drywall joints using various adhesives including conventional adhesives such as joint compound. However, the yucca adhesive disclosed herein is greatly preferred. The drywall tape 310 can be applied to drywall joints with or without use of the drywall tape applicators. Where the drywall tape 310 is applied to drywall joints without use of a drywall tape applicator, the drywall tape 310 can be applied, in accordance with conventional wall finishing techniques, by applying the drywall tape 310 over a bedding coat or layer of adhesive previously applied to the drywall joints. In the latter case, it is preferred that the fluidic yucca adhesive disclosed herein be used as the bedding coat or layer of adhesive over which the drywall tape 310 is applied. In a similar manner, the fluidic yucca adhesive may be used instead of joint compound to apply conventional drywall tapes, such as drywall tape 310, to drywall joints.

The drywall tapes of the present invention have specific, non-uniform cross-sections or thicknesses to prevent the drywall tapes from sinking into the gaps and/or depressions of drywall joints. The drywall tapes can be formed of a single, unitary piece or part or of multiple pieces or parts. The drywall tapes can be provided with or without an adhesive pre-applied thereto. Various adhesives, either pre-applied to the drywall tapes or applied to the drywall tapes during use, can be used to secure the drywall tapes to sheets of drywall, although yucca adhesive is preferred. Adhesive can be applied to the drywall tapes during use by being applied to the drywall tapes prior to securement of the drywall tapes to the drywall sheets or by virtue of the drywall tapes being applied over a bedding coat or layer of adhesive previously applied to the drywall joints. The drywall tapes can be applied to drywall joints with or without the use of a drywall tape applicator.

The yucca adhesive can be pre-applied to various types of drywall tapes to be non-sticky or inactivated when dry and to become sticky or activated when wet. The yucca adhesive pre-applied to drywall tapes can be activated with or without the use of a drywall tape applicator. The yucca adhesive can be supplied in powder or fluidic form as an individual product to be used in place of joint compound to apply various types of drywall tapes to sheets of drywall, with or without use of a drywall tape applicator. When supplied in powder form, the yucca adhesive is mixed with water prior to use while the fluidic form of the yucca adhesive can be supplied ready to use.

The applicators of the present invention allow adhesive and non-adhesive drywall tapes to be applied to drywall joints quickly and accurately, thusly reducing the amount of time required to finish drywall joints while obtaining high quality finished joints. The applicators serve to impart adhesiveness or adhesive properties to drywall tapes being dispensed therefrom, either by activating a pre-applied adhesive on the drywall tapes or applying an activated adhesive to the drywall tapes. The applicators eliminate the need for the drywall tape to be directly handled by the wall finisher and avoid the messiness and sloppiness associated with conventional wall finishing procedures. The applicators of the present invention can be used with various adhesive drywall tapes having fluid activated or fluid soluble adhesives pre-applied thereto. Various fluidic or viscous adhesives can be supplied to the applicators for use with non-adhesive drywall tapes. The housings of the applicators are preferably designed to be lightweight for ease of use. The applicators and the drywall tapes according to the present invention may each be used to finish various horizontal or vertical drywall joints on both wall surfaces and ceiling surfaces.

Inasmuch as the present invention is subject to many variations, modifications, and changes in detail, it is intended that all subject matter discussed above or shown in the accompanying drawings be interpreted as illustrative only and not be taken in a limiting sense.

What is claimed is:

1. A drywall tape for being applied over a drywall joint formed by adjacent edges of drywall sheets, respectively, having outer surfaces, respectively, including non-sloping outer surface portions and sloping outer surface portions sloping inwardly from the non-sloping outer surface portions to the edges, respectively, such that a depression is formed at the joint by the sloping outer surface portions, the depression having a maximum width between the non-sloping outer surface portions, said drywall tape comprising
   a narrow paper tape of uniform width and non-uniform thickness, said tape having a central portion of greater thickness and side portions of lesser thickness, said tape having a planar outer surface and a non-planar inner surface defining said non-uniform thickness therebetween, said non-planar inner surface being defined in part by a planar inner face of said central portion, said planar inner face being parallel to said planar outer surface, said tape having side edges defining said uniform width therebetween, said uniform width being less than the maximum width of the depression, said planar inner face being centrally located between said side edges and being of uniform width less than said uniform width of said tape whereby said tape occupies the depression such that said planar outer surface is substantially aligned with the non-sloping outer surface portions when said tape is centered over the drywall joint with said inner surface secured to the drywall sheets.

2. A drywall tape as recited in claim 1 wherein the non-sloping outer surface portions are disposed in a plane and said outer surface of said tape is substantially disposed in the plane when said tape is centered over the drywall joint with said inner surface secured to the drywall sheets.

3. A drywall tape as recited in claim 1 wherein said central portion and said side portions are formed integrally, unitarily as a single strip of paper.

4. A drywall tape for being applied over a drywall joint formed by adjacent edges of drywall sheets, respectively, having outer surfaces, respectively, including non-sloping outer surface portions and sloping outer surface portions sloping inwardly from the non-sloping outer surface portions to the edges, respectively, such that a depression is formed at the joint by the sloping outer surface portions, the depression having a maximum width between the non-sloping outer surface portions, said drywall tape comprising a narrow paper tape of uniform width and non-uniform thickness, said tape having a central portion of greater thickness and side portions of lesser thickness, said tape having a planar outer surface and a non-planar inner surface defining said non-uniform thickness therebetween, said tape having side edges defining said uniform width therebetween, said uniform width being less than the maximum width of the depression, said central portion being centrally located between said side edges and having a uniform width less than said uniform width of said tape whereby said tape occupies the depression such that said planar outer surface is substantially aligned with the non-sloping outer surface portions when said tape is centered over the drywall joint with said inner surface secured to the drywall sheets, said tape including an outer strip of paper and an inner strip of paper secured to said outer strip, said outer strip having a uniform width defining said uniform width of said tape, a planar outer face, a planar innerface and a uniform thickness between said outer and inner faces, said inner strip having a uniform width defining said uniform width of said central portion, a planar outerface, a planar inner face and a uniform thickness between said outer and inner faces of said inner strip, said thickness of said outer strip being the same as said thickness of said inner strip, said outerface of said inner strip being secured to said inner face of said outer strip with said inner strip centered between said side edges such that said inner strip covers a middle portion of said inner face of said outer strip and does not cover lateral portions of said inner face of said outer strip, said non-planar inner surface being defined by said inner face of said inner strip and said lateral portions of said inner face of said outer strip, said central portion having a thickness corresponding to the combined thicknesses of said inner and outer strips and said side portions having a thickness corresponding to said thickness of said outer strip.

5. A drywall tape as recited in claim 1 wherein said width of said planar inner face is approximately one-half said width of said tape.

6. A drywall tape as recited in claim 5 wherein said width of said tape is approximately two inches.

7. A drywall tape as recited in claim 1 and further including a pre-applied adhesive disposed on the entirety of said non-planar inner surface.

8. A drywall tape for being applied over a drywall joint formed by adjacent edges of drywall sheets, respectively, having outer surfaces, respectively, including non-sloping outer surface portions and sloping outer surface portions sloping inwardly from the non-sloping outer surface portions to the edges, respectively, such that a depression is formed at the joint by the sloping outer surface portions, the depression having a maximum width between the non-sloping outer surface portions, said drywall tape comprising a narrow paper tape of uniform width and non-uniform thickness, said tape having a central portion of greater thickness and side portions of lesser thickness, said tape having a planar outer surface and a non-planar inner surface defining said non-uniform thickness therebetween, said tape having side edges defining said uniform width therebetween, said uniform width being less than the maximum width of the depression, said central portion being centrally located between said side edges and having a uniform width less than said uniform width of said tape whereby said tape occupies the depression such that said planar outer surface is substantially aligned with the non-sloping outer surface portions when said tape is centered over the drywall joint with said inner surface secured to the drywall sheets; and a pre-applied adhesive disposed on the entirety of said non-planar inner surface, said adhesive being a dry, non-sticky yucca adhesive, said yucca adhesive becoming sticky when wet to adhere to the drywall sheets when said tape is applied over the drywall joint, said yucca adhesive becoming stiff after drying to adhesively secure said tape to the drywall sheets.

9. An adhesive drywall tape for being applied over a drywall joint formed by adjacent edges of drywall sheets, respectively, comprising a narrow tape of uniform width and minimal thickness, said tape having an inner surface for being secured to the drywall sheets with said width centered over the drywall joint and having a planar outer surface; and a coating of yucca adhesive pre-applied on said inner surface, said yucca adhesive being dry and non-sticky in an inactivated state prior to being exposed to fluid, said yucca adhesive becoming sticky in an activated state upon being exposed to fluid to adhere to the drywall sheets when said tape is applied over the drywall joint, said yucca adhesive becoming stiff after drying to adhesively secure said tape to the drywall sheets.

10. An adhesive drywall tape as recited in claim 9 wherein said tape is made of paper and said yucca adhesive is pre-applied on the entirety of said inner surface.

11. An adhesive drywall tape as recited in claim 10 wherein said inner surface in non-planar.

12. An adhesive drywall tape as recited in claim 11 wherein said minimal thickness is non-uniform.

13. An adhesive drywall tape as recited in claim 12 wherein said minimal thickness is defined by a central portion of said tape of greater thickness and side portions of said tape of lesser thickness, said greater and lesser thicknesses being defined between said inner and outer surfaces.

14. An adhesive drywall tape as recited in claim 13 wherein the drywall sheets have outer surfaces, respectively, the outer surfaces having sloping outer surface portions adjacent the edges, respectively, of the drywall sheets, the sloping outer surface portions sloping inwardly from non-sloping outer surface portions of the outer surfaces, respectively, toward the edges, respectively, such that a depression is formed at the joint by the sloping outer surface portions, the depression having a maximum width between the non-sloping outer surface portions and wherein said uniform width is less than the maximum width of the depression and said central portion has a width, less than said uniform width of said tape, such that said tape is disposed in the depression with said outer surface substantially flush with the non-sloping outer surface portions when said tape is applied over the joint.

* * * * *